United States Patent
Thompson

(10) Patent No.: US 8,288,048 B2
(45) Date of Patent: Oct. 16, 2012

(54) FUEL CELL/BATTERY THERMAL MANAGEMENT SYSTEM

(75) Inventor: Dale R. Thompson, Fort Wayne, IN (US)

(73) Assignee: Parker-Hannifin Corporation, Cleveland, OH (US)

(*) Notice: Subject to any disclaimer, the term of this patent is extended or adjusted under 35 U.S.C. 154(b) by 137 days.

(21) Appl. No.: 12/763,388

(22) Filed: Apr. 20, 2010

(65) Prior Publication Data
US 2010/0258063 A1 Oct. 14, 2010

Related U.S. Application Data

(63) Continuation of application No. PCT/US2008/078703, filed on Oct. 3, 2008.

(60) Provisional application No. 60/977,145, filed on Oct. 3, 2007.

(51) Int. Cl.
*H01M 8/04* (2006.01)
*F01P 9/04* (2006.01)

(52) U.S. Cl. ........ 429/436; 429/438; 429/440; 429/442; 123/41.3; 219/208

(58) Field of Classification Search .................. None
See application file for complete search history.

(56) References Cited

U.S. PATENT DOCUMENTS

| | | | |
|---|---|---|---|
| 3,253,957 A | 5/1966 | Turner et al. | |
| 3,300,341 A | 1/1967 | Gregory et al. | |
| 3,905,884 A | 9/1975 | Parenti, Jr. et al. | |
| 6,673,482 B2 | 1/2004 | Imazeki et al. | |
| 6,866,955 B2 | 3/2005 | Lee et al. | |
| 7,056,611 B2 | 6/2006 | Fabis et al. | |
| 7,067,211 B2 | 6/2006 | Lee et al. | |
| 7,135,245 B2 | 11/2006 | Standke et al. | |
| 7,147,071 B2 | 12/2006 | Gering et al. | |
| 7,261,150 B2 | 8/2007 | Cargnelli et al. | |
| 7,264,895 B2 | 9/2007 | White | |
| 2003/0044662 A1 | 3/2003 | Walsh | |
| 2004/0001985 A1 | 1/2004 | Alva | |
| 2004/0009382 A1* | 1/2004 | Fly | 429/26 |

(Continued)

FOREIGN PATENT DOCUMENTS

EP 1637709 A2 * 3/2006

(Continued)

OTHER PUBLICATIONS

David L. Saums et al, "Vaporizable Dielectric Fluid Cooling of IGBT Power Semiconducters For Vehicle Powertrains" Fifth IEEE Vehicle Power and Propulsion Conference (VPPC' 09), Sep. 7-11, 2009, Dearborn, MI USA.

*Primary Examiner* — Keith Walker
(74) *Attorney, Agent, or Firm* — Thomas G. Fistek; Robert J. Clark

(57) ABSTRACT

A thermal management system is disclosed for a hybrid vehicle having an electrochemical power source (battery/fuel cell) and an internal combustion engine. In cooling mode, the system will flow liquid refrigerant over an evaporator attached to the battery/fuel cell, a two-phase mixture will then flow to the condenser where the heat is dissipated to ambient. In cold conditions where the battery/fuel cell needs to be warmed, the system will pick up heat from the engine and pump the warm fluid back to the battery/fuel cell until its optimal operating temperature is reached.

12 Claims, 1 Drawing Sheet

U.S. PATENT DOCUMENTS

| | | |
|---|---|---|
| 2005/0058868 A1 | 3/2005 | Taga |
| 2005/0103487 A1* | 5/2005 | Aflekt et al. ................ 165/202 |
| 2005/0130003 A1 | 6/2005 | Lee et al. |
| 2005/0175875 A1 | 8/2005 | Nelson et al. |
| 2005/0218135 A1* | 10/2005 | Kraemer et al. ............. 219/202 |
| 2006/0132101 A1 | 6/2006 | Ambrosio et al. |
| 2007/0042247 A1 | 2/2007 | Baird et al. |
| 2007/0082239 A1 | 4/2007 | Shiroma et al. |
| 2007/0141420 A1 | 6/2007 | Voss et al. |

FOREIGN PATENT DOCUMENTS

| | | |
|---|---|---|
| JP | 10302826 A | 11/1998 |

* cited by examiner

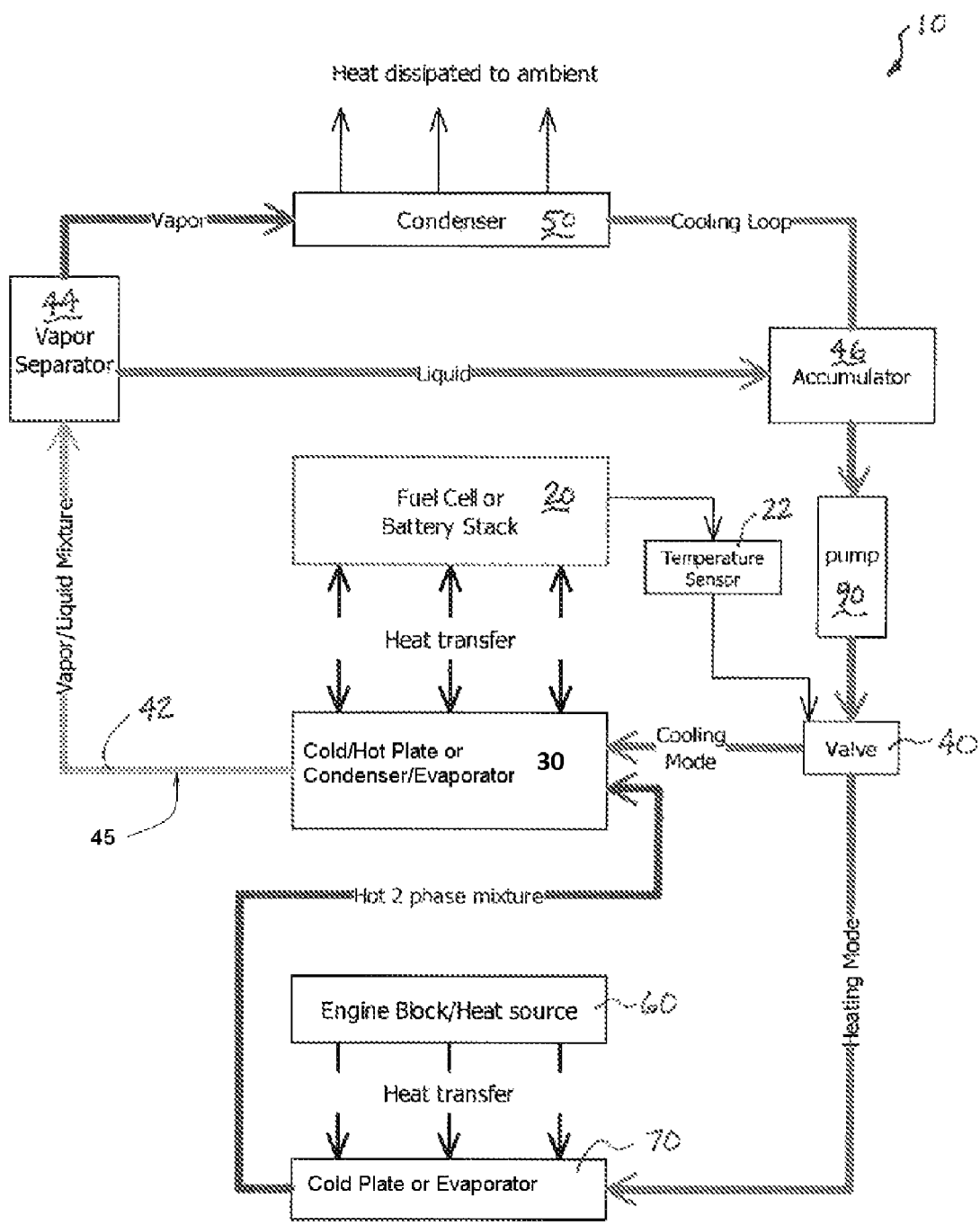

FUEL CELL/BATTERY THERMAL MANAGEMENT SYSTEM

CROSS-REFERENCE TO RELATED CASES

This application is a continuation of Patent Application PCT/US08/78703; filed Oct. 3, 2008, which claims the benefit of U.S. Provisional Application Ser. No. 60/977,145; filed Oct. 3, 2007, the disclosure of which is expressly incorporated herein by reference.

TECHNICAL FIELD

This invention relates to thermal management system for electrochemical power sources such as batteries and/or fuel cells, and more particularly to a method and apparatus for supplying both heat and cooling to the power source to increase its operational efficiency.

BACKGROUND

For both fuel cells and battery systems to achieve optimal performance they must be maintained within a specified temperature envelope. In hot conditions, the fuel cells and/or batteries must be cooled until its optimal operating temperature is reached. Conversely, in cold conditions, the fuel cells and/or batteries must be the heated until its optimal operating temperature is reached.

SUMMARY OF THE INVENTION

At least one embodiment of the invention provides a thermal management system for a hybrid vehicle having an electrochemical power source and an internal combustion engine, the system comprising: a first heat exchanger associated with the electrochemical power source; a second heat exchanger associated with the engine; a third heat exchanger capable of dissipating heat to an ambient; a pump for moving a vaporizable fluid through the system; a vapor separator and an accumulator; the vapor separator positioned between the first heat exchanger and the third heat exchanger; the vapor separator adapted to direct vaporized fluid to the third heat exchanger and liquid fluid to the accumulator; a temperature sensor capable of sensing the temperature of the electrochemical power source; a valve selectively directing the fluid to the first heat exchanger in a cooling mode when the temperature of the electrochemical power source is above a predetermined temperature and directing the fluid to the second heat exchanger and then to the first heat exchanger in a heating mode when the temperature of the electrochemical power source is at or below a predetermined first temperature.

At least one embodiment of the invention provides a thermal management system for a hybrid vehicle having an electrochemical power source and an internal combustion engine, the system comprising: a thermal circuit loop having a vaporizable refrigerant fluid flowing therethrough, the thermal circuit loop comprising a first cold plate associated with the electrochemical power source, a second cold plate associated with the heat source, a condenser dissipating heat to an ambient, and a pump for moving the fluid through the thermal circuit; a temperature sensor capable of sensing the temperature of the electrochemical power source; a bypass valve in the thermal circuit loop selectively directing the fluid to bypass the second cold plate in a cooling mode when the temperature of the electrochemical power source is above a predetermined temperature and directing the fluid to the second cold plate in a heating mode when the temperature of the electrochemical power source is at or below a predetermined first temperature.

BRIEF DESCRIPTION OF THE DRAWINGS

FIG. 1 is a block diagram of an embodiment of the thermal management system according to the present invention.

DESCRIPTION OF DRAWINGS

The system of the present invention is a thermal management system for a hybrid vehicle having an electrochemical power source (battery or fuel cell) and an internal combustion engine. For both fuel cells and battery systems to achieve optimal performance they must be maintained within a specified temperature envelop. In cooling mode, the system will flow liquid refrigerant over an evaporator attached to the battery/fuel cell, a two-phase mixture will then flow to the condenser where the heat is dissipated to ambient. In cold conditions where the battery/fuel cell needs to be warmed, the system will pick up heat from either an engine block or resistance heater and pump the warm fluid back to the target until its optimal operating temperature is reached.

Referring now to the drawing of FIG. 1, an embodiment of the thermal management system 10 of the present invention is shown utilizing a thermal circuit loop 45. The thermal management system 10 is provided for a hybrid vehicle having an electrochemical power source 20 typically in the form of a battery or fuel cell. The power source 20 has an optimal temperature at which it provides optimal performance. A first heat exchanger 30 is positioned wherein heat transfer with the electrochemical power source 20 can take place to either cool or heat the power source 20 as needed. The first heat exchanger 30 is typically either a cold/hot plate or a condenser/evaporator. Such a cold/hot plate is disclosed in U.S. Pat. No. 6,508,301, issued on Jan. 21, 2003 and herein incorporated by reference. The system 10 includes a temperature sensor 22 capable of sensing the temperature of the electrochemical power source 20. Using a predetermined temperature limit, the sensor 22 information is used to provide either heating or cooling to the power source 20.

In a cooling mode, a valve 40 directs fluid 42 having a temperature less than the temperature of the power source 20 into the first heat exchanger 30 wherein the fluid 42 is heated by the heat transfer that takes place between the heat exchanger 30 and the power source 20 wherein the power source 20 is cooled. The fluid 42 may be any suitable fluid including a vaporizable (two-phase) dielectric refrigerant. The heating of the fluid 42 in the first heat exchanger 30 may cause the fluid to partially or completely change phase from a liquid to a vapor. The fluid 42 exits the first heat exchanger 30 and is directed to a second heat exchanger 50. The second heat exchanger 50 is typically a condenser. In one embodiment, the system 10 includes a vapor separator 44 that directs only the vapor to the second heat exchanger 50 and directs the liquid to an accumulator 46, bypassing the second heat exchanger 50. Vapor entering the second heat exchanger 50 is cooled through heat transfer by the ambient. The cooled liquid fluid 42 then leaves the second heat exchanger 50 and enters accumulator 46 where it is then passed back to the valve 40 by a pump 90, completing the cooling cycle.

In a heating mode, the system 10 utilizes a heat source 60 which is at a temperature higher than the power source 20. In a vehicle application, the heat source 60 may be in the form of an engine block or other auxiliary systems associated with the engine or braking systems. The valve 40 directs fluid 42 into a third heat exchanger 70 wherein the fluid 42 is heated by the heat transfer that takes place between the third heat exchanger 70 and the heat source 60. The third heat exchanger 70 is typically either a cold plate or an evaporator. The heating of the fluid 42 in the third heat exchanger 70 may cause the fluid to partially or completely change phase from a liquid to a vapor. The fluid 42 exits the third heat exchanger 70 and is directed to the first heat exchanger 30. The fluid 42 having a temperature greater than the temperature of the power source 20 is cooled by the heat transfer that takes place between the first heat exchanger 30 and the power source 20 wherein the power source 20 is heated. The cooled fluid 42 leaves the first heat exchanger 30 and is directed to the second heat exchanger 50, or as previously discussed, to the vapor separator 44 that directs only the vapor to the second heat exchanger 50 and directs the liquid to an accumulator 46, bypassing the second heat exchanger 50 and is directed back to the valve 40 by the pump 90, completing the heating cycle. Vaporized fluid 42, if any, entering the second heat exchanger 50 from the vapor separator 44 is cooled through heat transfer by the ambient. The cooled liquid fluid 42 then leaves the second heat exchanger 50 and enters accumulator 46 where it is then passed back to the valve 40 by the pump 90.

It is noted that the system 10 utilizes the pump 90 to direct the fluid 42 through the fluid circuit and that no compressor is used. The fluid 42 is completed contained in the system 10 in a hermetic manner.

Although the principles, embodiments and operation of the present invention have been described in detail herein, this is not to be construed as being limited to the particular illustrative forms disclosed. They will thus become apparent to those skilled in the art that various modifications of the embodiments herein can be made without departing from the spirit or scope of the invention. Accordingly, the scope and content of the present invention are to be defined only by the terms of the appended claims.

What is claimed is:

1. A thermal management system for a hybrid vehicle having an electrochemical power source and an internal combustion engine, the system comprising:
    a first heat exchanger associated with the electrochemical power source;
    a third heat exchanger associated with the engine;
    a second heat exchanger capable of dissipating heat to an ambient;
    a pump for moving a vaporizable fluid through the first heat exchanger, the second heat exchanger, and the third heat exchanger;
    a temperature sensor capable of sensing the temperature of the electrochemical power source;
    a valve positioned between the pump, and each of the first heat exchanger and the third heat exchanger, the valve receiving fluid from the pump, and selectively directing the fluid (i) from the pump to the first heat exchanger and then to the second heat exchanger in a cooling mode when the temperature of the electrochemical power source is above a predetermined temperature or (ii) from the pump to the third heat exchanger and then to the first heat exchanger and then to the second heat exchanger in a heating mode when the temperature of the electrochemical power source is at or below a predetermined first temperature.

2. The system of claim 1, wherein the electrochemical power source is a battery or a fuel cell.

3. The system of claim 1, wherein in the heating mode the first heat exchanger is a condenser and in the cooling mode the first heat exchanger is an evaporator.

4. The system of claim 1, wherein the system does not include a compressor.

5. The system of claim 1, wherein the vaporizable fluid is a two-phase refrigerant.

6. The system of claim 1, wherein the vaporizable fluid is a dielectric material.

7. The system of claim 1, wherein the vaporizable fluid is hermetically sealed within the system.

8. The system of claim 1, further comprising a vapor separator and an accumulator, the vapor separator positioned between the first heat exchanger and the second heat exchanger; the vapor separator adapted to direct vaporized fluid to the second heat exchanger and liquid fluid to the accumulator.

9. The system of claim 1, wherein in the heating mode the first heat exchanger is a hot plate, and in the cooling mode the first heat exchanger is a cold plate.

10. The system of claim 1, wherein the second heat exchanger is a condenser.

11. The system of claim 1, wherein the third heat exchanger is an evaporator or a cold plate.

12. The system of claim 1, wherein the valve is operatively coupled to the temperature sensor, and information from the sensor is used to operate the system in the cooling mode or the heating mode.

* * * * *